United States Patent Office 2,854,485
Patented Sept. 30, 1958

2,854,485

PROCESS OF PREPARING POLY-HYDROXY ARYLOPHENONES

Lester N. Stanley, Delmar, N. Y., assignor to General Aniline & Film Corporation, New York, N. Y., a corporation of Delaware No Drawing. Application May 23, 1957
Serial No. 661,013

7 Claims. (Cl. 260—591)

This invention relates to poly-hydroxy arylophenones and particularly to an improved process of preparing the same.

Poly-hydroxy benzophenones are usually prepared by one of several methods. One method consists of fusing fluorescein chloride with caustic soda at 270–280° C. The yields obtained are minutely small and hence this method was never adapted for commercial production. Another method consists of condensing 2,4-diacetoxybenzonitrile and resorcinol in the presence of hydrochloric acid and zinc chloride followed by hydrolysis in acid solution to yield a hydroxy benzophenone. The disadvantage of this method is the need to work with anhydrous ether which is not possible under commercial conditions of manufacture. A commercially acceptable method consists of condensing resorcinol dimethyl ether with phosgene in the presence of aluminum chloride followed by demethylation as described in United States Patent 2,694,729. Demethylation of the condensed product is difficult to regulate and as a result the final product, i. e. 2,2′,4,4′-tetrahydroxybenzophenone is of low purity and the yield is exceedingly low ranging from 20 to 25% maximum. Despite the fact that this method has been used commercially, the low yield makes it unattractive for large scale commercial operation. Moreover, the price charged for the final product, because of the low yields obtained, is unusually high.

In order to overcome the problem of regulating demethylation, an attempt was made to condense β-resorcylic acid with resorcinol while employing aluminum chloride as a catalyst. The final product, i. e. 2,2′,4,4′-tetrahydroxyphenone, contained considerable tar, and on isolation also contained a considerable amount of xanthone as an impurity and was unsuitable as an ultraviolet absorber. A further attempt was made by replacing the aluminum chloride with zinc chloride and phosphorus oxychloride as catalysts. The final reaction product sets up to a hard concrete-like mass which is impossible to stir and therefore very difficult to isolate by drowning from the reaction mixture without local overheating and resultant decomposition to xanthone and tarry by-products. Even though the latter modification may be workable in small laboratory quantities, it is not suitable for large scale commercial production.

I have found that poly-hydroxy benzophenones are readily prepared in excellent yields and of high degree of purity by condensing an o-hydroxy aryl carboxylic acid with a phenol in the presence of zinc chloride and phosphorus oxychloride as catalysts and in the presence of aqueous phosphoric acid as a solvent. The use of the latter appears contrary to the usual condensation reactions employing aluminum chloride, zinc chloride and the like as catalysts since such reactions normally require an anhydrous medium. I have found that the condensation reaction runs smoothly with phosphoric acid as the solvent and that between 2–20% of water must be present for the reaction to run satisfactorily so as to give high yields of products of high degree of purity. If the medium is anhydrous, the reaction mass becomes very viscous, sets up to a solid and is not workable, and when too much water is present, i. e. 25% or above, the yields are very poor.

Accordingly, it is the principal object of the present invention to provide an improved method of preparing polyhydroxyarylophenones in high yields and of high purity which are particularly useful as ultraviolet absorbing agents.

Further objects and advantages will become more clearly manifest from the following description. The parts given are by weight.

In practicing the present invention, 1 part of an o-hydroxy aryl carboxylic acid, an approximately molecular equivalent of a phenol, 2–6 parts of phosphorus oxychloride, 1–3 parts of zinc chloride and 1–10 parts of 85–98% phosphoric acid ($H_3PO_4$) are heated at from 45–75° C. until evolution of hydrogen chloride ceases. This takes anywhere from 3 to 20 hours. The charge is then drowned in an ice water mixture, filtered and purified in the usual manner by solution and reprecipitation. The proportions of the reactants, i. e. o-hydroxy aryl carboxylic acid and a phenol, are not critical. In fact a slight excess up to about 10% of either one may be used to give final products of high yields and of high degree of purity. Optimum results are obtained if the ratio of o-hydroxy aryl carboxylic acid to phosphorus oxychloride is about 1 part of the former to about 2–6 parts of the latter and 1 part of the o-hydroxy aryl carboxylic acid to 1–3 parts of zinc chloride.

The surprising feature of the improved condensation method is that the reaction is carried out in the presence of aqueous phosphoric acid, the water of which destroys phosphorus oxychloride and inhibits the condensing effect of zinc chloride. As noted above, the amount of water present is critical since with the use of 75% of aqueous phosphoric acid only a 30% yield is obtained whereas when using 85% phosphoric acid a 75% yield of the poly-hydroxybenzophenone is obtained.

Another feature is that it is possible to allow the co-reactants to react for a period of time ranging from 1 to 2 hours without the addition of phosphoric acid and then adding the latter before the mass becomes too thick. As an alternative, the reaction may be started in anhydrous phosphoric acid and then adding more dilute phosphoric acid as the reaction proceeds in order to prevent the mass from becoming too thick. If the reaction is allowed to be carried out in the absence of phosphoric acid, the reaction product sets up to a hard mass which cannot be stirred during the final stage of the condensation reaction.

The o-hydroxy aryl carboxylic acids are characterized by the following general formulae:

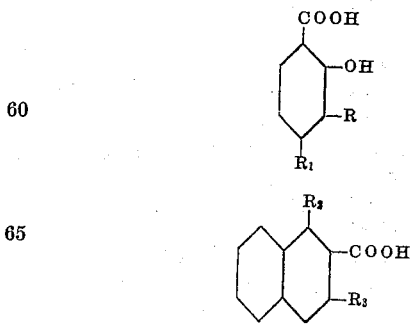

wherein R and $R_1$ represent either hydrogen, hydroxy, halogen, e. g. bromine, chlorine, etc., alkyl, e. g. methyl, ethyl, propyl, butyl, etc., or alkoxy, e. g. methoxy, ethoxy, propoxy, isopropoxy, butoxy, etc., $R_2$ represents either hydrogen or hydroxy, and $R_3$ represents either hydrogen or hydroxy. When either group $R_2$ or $R_3$ is hydroxy the other is hydrogen.

As illustrative examples of o-hydroxy aryl carboxylic acids which are condensed with a phenol, the following may be mentioned:

Salicylic acid
3-methylsalicylic acid
3-chlorosalicylic acid
3-methoxysalicylic acid
2,4-dihydroxybenzoic acid
4-methoxysalicyclic acid
4-ethoxysalicylic acid
4-methylsalicylic acid
4-chlorosalicylic acid
2,3,4-trihydroxybenzoic acid
1-hydroxy-2-naphthoic acid
3-hydroxy-2-naphthoic acid It is to be noted that a large class of o-hydroxy aryl carboxylic acids may be employed.

The phenols are characterized by the following general formula:

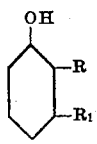

wherein R and $R_1$ have the same values as above.

As examples of phenols which may be employed, the following are illustrative:

Phenol
Resorcinol
Resorcinol monomethyl ether
Resorcinol monoethyl ether
m-Cresol
o-Cresol
o-Chlorophenol
Catechol
Guaiacol
m-Chlorophenol
Pyrrogallol The improved process will be more fully described in conjunction with the following examples. It is to be noted however, that these examples are merely illustrative of the invention and are not to be limited by the details set forth therein.

*Example I*

Into a two-liter glass beaker, there were added 250 cc. (419 grams) of phosphorus oxychloride, 300 cc. (513 grams) of 85% aqueous phosphoric acid, 200 grams of anhydrous zinc chloride, 100 grams of β-resorcylic acid and 87.5 grams of resorcinol. The mixture was stirred and heated to 60° C. in ½ hour and held at this temperature for about 8–10 hours or until the evolution of hydrogen chloride was almost complete. The charge was drowned in several liters of ice and water, filtered, and washed with cold 5% aqueous sodium bicarbonate solution. After treatment with the sodium bicarbonate solution, the charge was dissolved in hot water made slightly acid with HCl, treated with Nuchar with a very small amount of zinc dust, filtered, cooled, crystallized and filtered. The yield was about 120 grams (75% of theory) of pale yellow crystals of 2,2',4,4'-tetrahydroxybenzophenone having a melting point of 202.5° C.–203° C.

*Example II*

The following components were mixed in a two-liter beaker and stirred:

325 cc. phosphorus oxychloride (544 grams)
260 grams zinc chloride
130 grams β-resorcylic acid
115 grams resorcinol
230 cc. 95% phosphoric acid (412 grams)

The charge was warmed to 60° C. in about 1½ hours and held at that temperature for about 14 hours. It was drowned in ice water and worked up as in Example I. The yield was about 140 grams (68% of theory) of pale yellow crystals of 2,2',4,4'-tetrahydroxybenzophenone having a melting point of 202–203.8° C.

*Example III*

The following components were mixed in a two-liter beaker and stirred:

140 grams phosphorus oxychloride
67 grams zinc chloride
33.5 grams β-resorcylic acid
29.5 grams resorcinol
190 grams phosphoric acid (100%)

The charge was warmed to 60° C. over a 3 hour period and held there. The reaction mass thickened considerably over the next 2 hours. 85 grams of 75% aqueous phosphoric acid were added at intervals as needed to keep the reaction mass in a stirrable condition. The final concentration of phosphoric acid was 90%. The mass was stirred at 60° C. for 10 hours after the last addition of phosphoric acid and worked up in the same manner as in Example I. The yield of the product was 37 grams (70% of theory) with a melting point of 201.2–202.4° C.

*Example IV*

Example III was repeated with the exception that the addition of the phosphoric acid was omitted. In other words, the condensation reaction was carried out in an anhydrous medium. The reaction mass hardened and became unworkable and was discarded.

*Example V*

Example I was repeated with the exception that the 85% aqueous phosphoric acid was replaced by an equivalent amount of 75% aqueous phosphoric acid. Very little of 2,2',4,4'-tetrahydroxybenzophenone was formed since most of the starting β-resorcylic acid was recovered unchanged.

*Example VI*

Example I was repeated with the exception that 100 grams of β-resorcylic acid were replaced by 92 grams of salicylic acid. After treatment with sodium bicarbonate solution, as in Example I, the charge was dissolved in hot isopropanol, treated with Nuchar with a very small amount of zinc dust, filtered, cooled, crystallized and filtered. Pale yellow crystals of 2,2',4-trihydroxybenzophenone were obtained.

*Example VII*

Example I was repeated with the exception that 100 grams of β-resorcylic acid were replaced by 102 grams of 4-methylsalicylic acid. The final recrystallization was made from hot isopropanol in place of acidified water. Pale yellow crystals of 2,2',4'-trihydroxy-4-methylbenzophenone were obtained.

*Example VIII*

Example I was repeated with the exception that 100 grams of β-resorcylic acid were replaced by 110 grams of 4-chlorosalicylic acid. The final recrystallization was made from hot isopropanol in place of acidified water. Pale yellow crystals of 4-chloro-2,2',4'-trihydroxybenzophenone were obtained.

*Example IX*

Example I was again repeated with the exception that 87.5 grams of resorcinol were replaced by 74.6 grams of phenol. The final recrystallization was made from hot isopropanol in place of acidified water. Crystals of 2,2',4-trihydroxybenzophenone were obtained.

*Example X*

Example I was again repeated with the exception that 87.5 grams of resorcinol were replaced by 99 grams of resorcinol monomethyl ether. The final recrystallization was made from hot isopropanol in place of acidified water. Yellow crystals of 2,2',4-trihydroxy-4'-methoxybenzophenone were obtained.

Example XI

Example I was again repeated with the exception that 87.5 grams of resorcinol were replaced by 100 grams of pyrogallol. Yellow crystals of 2,2',3,4,4'-pentahydroxybenzophenone were obtained. Since this product is water-soluble, it may be recrystallized from water.

Example XII

Example I was again repeated with the exception that 100 grams of β-resorcylic acid were replaced by 122 grams of 1-hydroxy-2-naphthoic acid. The final recrystallization was made from hot isopropanol in place of acidified water. Yellow crystals of 1,2',4'-trihydroxy-2-naphthophenone were obtained.

Example XIII

Example I was again repeated with the exception that 100 grams of β-resorcylic acid were replaced by 114 grams of 2,3,4-trihydroxy benzoic acid. Yellow crystals of 2,2',3,4,4'-pentahydroxybenzophenone were obtained.

I claim:

1. The process of preparing polyhydroxy arylophenones which comprises condensing an o-hydroxy aryl carboxylic acid with a phenol in the presence of a mixture of phosphorus oxychloride and zinc chloride as a catalyst and in the presence of 85–98% phosphoric acid as a solvent, at a temperature ranging from 45–75° C., and isolating and purifying the said phenone.

2. The process of preparing polyhydroxy arylophenones which comprises condensing at a temperature of 45–75° C. 1 part by weight of an o-hydroxy aryl carboxylic acid with an approximately molecular equivalent weight of a phenol in the presence of a catalyst mixture consisting of 2–6 parts by weight of phosphorus oxychloride and 1–3 parts by weight of zinc chloride, in the presence of 1–10 parts by weight of 85–98% phosphoric acid as a solvent, and isolating and purifying the said phenone.

3. The process according to claim 1 wherein the said o-hydroxy aryl carboxylic acid is β-resorcylic acid.

4. The process according to claim 1 wherein the said o-hydroxy aryl carboxylic acid is 4-methyl salicylic acid.

5. The process according to claim 1 wherein the said o-hydroxy aryl carboxylic acid is 4-chloro salicylic acid.

6. The process according to claim 1 wherein the said o-hydroxy aryl carboxylic acid is salicylic acid.

7. The process according to claim 1 wherein the said o-hydroxy aryl carboxylic acid is 2,3,4-trihydroxy benzoic acid.

References Cited in the file of this patent

UNITED STATES PATENTS

| | | |
|---|---|---|
| 415,088 | Bohn | Nov. 12, 1889 |
| 2,386,007 | Schmerling et al. | Oct. 2, 1945 |
| 2,645,663 | Newton | July 14, 1953 |